(12) United States Patent
Yadav

(10) Patent No.: US 7,949,865 B1
(45) Date of Patent: May 24, 2011

(54) MOUNTING VOLUMES ON DEMAND

(75) Inventor: Sandeep Yadav, Santa Clara, CA (US)

(73) Assignee: Network Appliance, Inc., Sunnyvale, CA (US)

(*) Notice: Subject to any disclaimer, the term of this patent is extended or adjusted under 35 U.S.C. 154(b) by 910 days.

(21) Appl. No.: 11/857,650

(22) Filed: Sep. 19, 2007

(51) Int. Cl.
*G06F 9/24* (2006.01)

(52) U.S. Cl. ........... 713/1; 713/2; 707/705; 707/821; 711/111; 711/112; 711/166

(58) Field of Classification Search ............ 713/1, 2; 707/705, 821; 711/112, 111, 166
See application file for complete search history.

(56) References Cited

U.S. PATENT DOCUMENTS

| | | | |
|---|---|---|---|
| 6,757,695 B1* | 6/2004 | Noveck et al. | 1/1 |
| 6,816,941 B1* | 11/2004 | Carlson et al. | 711/111 |
| 7,194,595 B1 | 3/2007 | Fair et al. | |
| 7,328,287 B1* | 2/2008 | Arumugham et al. | 710/31 |
| 7,487,288 B2* | 2/2009 | Kishi et al. | 711/112 |
| 2003/0233596 A1* | 12/2003 | Corbin et al. | 714/5 |
| 2005/0256999 A1* | 11/2005 | Kishi et al. | 711/111 |
| 2006/0064430 A1* | 3/2006 | Cannon et al. | 707/102 |
| 2006/0101200 A1* | 5/2006 | Doi | 711/113 |
| 2007/0079062 A1* | 4/2007 | Miyawaki et al. | 711/112 |
| 2008/0040723 A1* | 2/2008 | Haustein et al. | 718/104 |
| 2009/0043958 A1* | 2/2009 | Kaneda et al. | 711/112 |

* cited by examiner

*Primary Examiner* — Vincent T Tran
(74) *Attorney, Agent, or Firm* — Blakely, Sokoloff, Taylor & Zafman LLP (57) ABSTRACT

A method for mounting volumes to a storage server in a storage system, including, speeding up initialization of the storage server by staging volume mounting in two or more stages. The method further includes mounting at least one of the volumes when a request for accessing the volume is received.

19 Claims, 7 Drawing Sheets

MOUNTING VOLUMES ON DEMAND

FIELD OF THE INVENTION

At least one embodiment of the invention pertains to network storage systems, and more particularly, to a storage system server that manages attached storage volumes.

BACKGROUND

Various forms of network-based storage systems exist today. These forms include network attached storage (NAS), storage area networks (SANs), and others. Network storage systems are commonly used for a variety of purposes, such as providing multiple users with access to shared data, backing up critical data (e.g., by data mirroring), and the like.

A network-based storage system typically includes at least one storage server, which is a processing system configured to store and retrieve data on behalf of one or more client processing systems ("clients"). A storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

Some network-based storage systems are capable of creating and maintaining flexible volumes. A "flexible volume" is flexibly associated with the underlying physical storage device (e.g., disks), such that there does not have to be a one-to-one relationship between a flexible volume and a physical storage device. Currently available filer implementations can serve a large number of discrete flexible volumes. The number of flexible volumes on a filer can be tens of thousands or more. When a storage system is rebooted, it generally takes a long time to initialize the storage operating system and file systems. This is because, when a filer is brought online, all of the existing online volumes, including traditional and flexible volumes, need to be mounted. When a volume is mounted, a large amount of data and metadata are read in from disks. Since the data and metadata can be anywhere on the disks, the read involves random disk access incurring seek and rotational latencies. As the number of volumes on a filer increases, so does the amount of information that needs to be loaded from disks. This causes the boot time of a filter to increase substantially linearly with the number of volumes on the filer.

SUMMARY OF THE INVENTION

The present invention includes a method and apparatus for mounting volumes to a storage server in a storage system. The method comprises, speeding up initialization of the storage server by staging volume mounting in two or more stages. The method further comprises mounting at least one of the volumes when a request for accessing the volume is received.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for mounting volumes on demand are described. References in this specification to "an embodiment", "one embodiment", or the like, mean that the particular feature, structure or characteristic being described is included in at least one embodiment of the present invention. However, occurrences of such phrases in this specification do not necessarily all refer to the same embodiment.

In one aspect, the technique described herein significantly reduces the dependency between boot time (or, equivalently, the initialization time) and the number of volumes on a filer. More specifically, the initialization time of a filer is independent of the total number of volumes on the filer. This can be accomplished by mounting the volumes in two or more stages. For example, volumes that are needed during or immediately after the boot time can be mounted at boot time, while other volumes can be mounted on demand when they are first accessed. Mounting a volume involves accessing on-disk files and incurs disk latencies. Since a single filer may support tens of thousands of volumes and not all of the volumes are needed at boot time, staging volume mounting can significantly decrease the amount of time spent on extra mounting work, and hence reduces the boot time. The extra mounting work includes, but is not limited to, disk access, reading and initializing configuration files, and creating information of the volumes in memory.

The technique described herein can be applied to any group mounting event, that is, an event during which a plurality of volumes (or other type of logical data container) are mounted. A group mounting event includes, but is not limited to, initialization (e.g., reboot after a clean shutdown or reboot after a crash), takeover, giveback, and any event that triggers the mounting of a plurality of volumes. Instead of mounting all of the volumes to a storage server, only traditional volumes, aggregates, root volumes, and those flexible volumes (see definitions below) needed for replaying the log in non-volatile random access memory (NVRAM) are mounted at the group mounting event. Mounting operations for those flexible volumes not needed for the replay are delayed until a request for accessing the flexible volumes is received. As a result, mounting time for bringing a storage server online is significantly reduced.

Takeover and giveback occur in cluster-failover configurations. When a storage server in a cluster fails and another storage server (the takeover server) takes over the service provided by the failed server, the volumes that are originally mounted to the failed server need to be re-mounted to the takeover server. Similarly, after the failed server is rebooted and restores its service (the restored server), those volumes that were taken away can now be given back to the restored server. In both takeover and giveback events, there are potentially tens of thousands of volumes that need to be mounted. Staging volume mounting can lead to faster takeover and giveback times.

In another aspect, the time for mounting a volume on demand can be reduced by performing a partial mounting of the volume. Upon receiving a request for accessing a volume that has not yet been mounted, the storage server only initializes the configuration files that are necessary for responding to the request. Configuration files that are not needed for responding to the request are not initialized, that is, not read from the disks.

In yet another aspect, the technique described herein minimizes system memory consumption in a storage server by reducing metadata (or equivalently, metafiles) stored in the system memory. Volumes that are not accessed for a predetermined time are unmounted. Metadata associated with those unmounted volumes are unloaded from the system memory or recycled for other uses.

Before further discussing this technique, it is useful to discuss certain background information and to define certain terminology. In some conventional storage servers, data is stored in logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit. A volume includes one or more file systems, such as an active file system and, optionally, one or more persistent point-in-time images of the active file system captured at various instances in time. A "file system" is an independently managed, self-contained, hierarchal set of data units (e.g., files, blocks, or logical unit numbers (LUNs)). Although a volume or file system (as those terms are used herein) may store data in the form of files, that is not necessarily the case. That is, a volume or file system may store data in the form of other units of data, such as blocks or LUNs.

It is assumed here, to facilitate description only and not by way of limitation, that a storage system which implements the technique introduced herein is capable of creating and maintaining two different types of volumes: flexible volumes and traditional volumes. A "traditional volume" has a fixed, one-to-one relationship with the underlying physical storage (aggregate). In contrast, a "flexible volume" is flexibly associated with the underlying aggregate. In other words, the boundaries between aggregates and flexible volumes are flexible, such that there does not have to be a one-to-one relationship between a flexible volume and an aggregate. An aggregate can contain one or more flexible volumes. Henceforth in this description, all references to a "volume" or "volumes" shall refer to both traditional volumes and flexible volumes, unless specifically stated otherwise.

To keep track of the organization of blocks stored in an aggregate, a storage server maintains various hierarchical data structures, called buffer trees. A buffer tree may represent, for example, a volume defined within an aggregate or a file defined within a volume. For any particular file, there are generally two relevant buffer trees, namely a container file buffer tree (hereinafter "container buffer tree") and a user file buffer tree (hereinafter "user buffer tree"). The user buffer tree represents the particular file, while the container buffer tree represents the volume which contains the file. The root of the buffer tree is known as an "inode", which is a metadata structure that contains metadata about the file.

Figure 1:
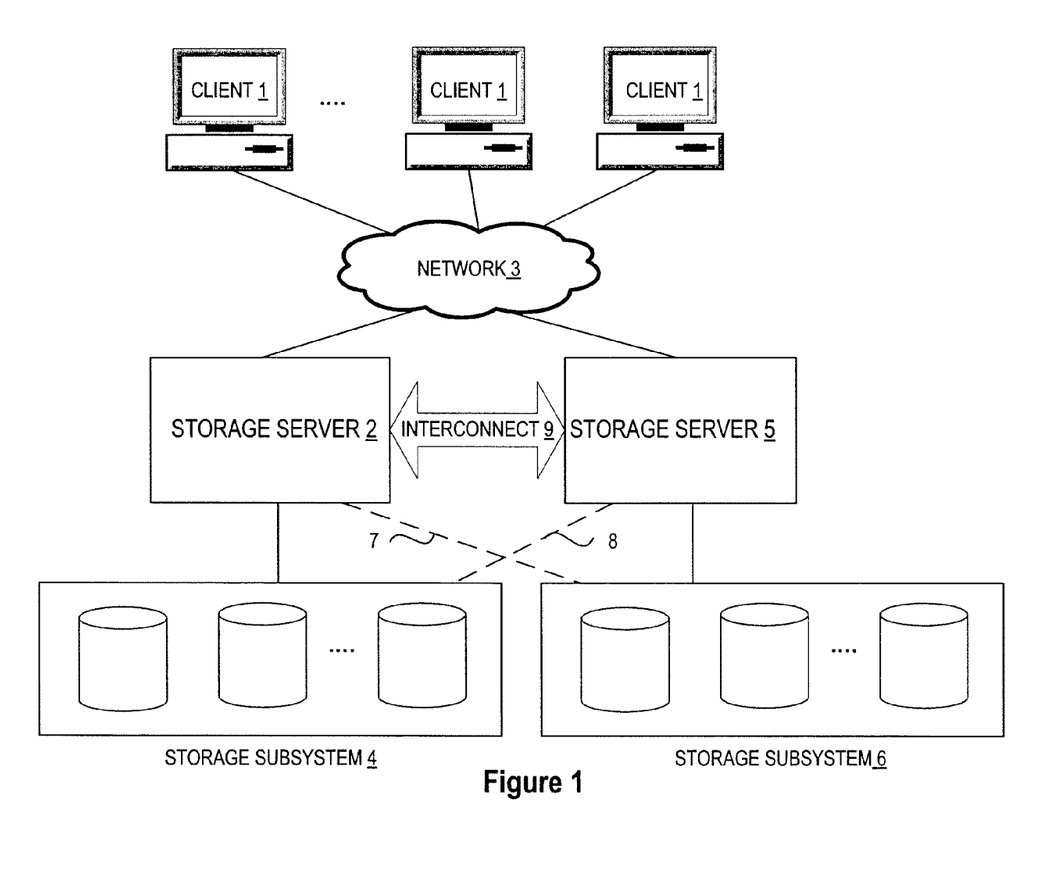
FIG. 1 illustrates a network environment which includes a storage server and its cluster partner.

FIG. 1 shows a simple example of a network environment which incorporates a storage server 2. The storage server 2 can be a file server or "filer," in which the technique introduced here can be implemented. Note that the technique described herein can also be applied in other types of storage systems, such as storage servers which provide clients with block-level access to stored data or processing systems other than storage servers, and network devices configured to provide storage services.

Referring to FIG. 1, the storage server 2 is coupled to a storage subsystem 4 which includes a set of mass storage devices, and to a set of storage clients 1 (hereinafter simply "clients") through a network 3. The network 3 may be, for example, a local area network (LAN), a wide area network (WAN), a metropolitan area network (MAN), a global area network (GAN), such as the Internet, a Fibre Channel fabric, or the like, or a combination of any such types of networks. Each of the clients 1 may be, for example, a conventional personal computer (PC), server-class computer, workstation, or the like.

The storage subsystem 4 is managed by the storage server 2. The storage server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD-based storage, magneto-optical (MO) storage, or any other type of non-volatile storage devices suitable for storing large quantities of data.

Although illustrated as a self-contained element, the storage server 2 may have a distributed architecture; for example, it may include a separate N-("network") module and D-("data") module (not shown). In such an embodiment, the N-module is used to communicate with clients 1, while the D-module includes the file system functionality and is used to communicate with the storage subsystem 4. The N-module and D-module can communicate with each other using an internal protocol. Alternatively, the storage server 2 may have an integrated architecture, where the network and data components are all contained in a single box. The storage server 2 may also be coupled through a switching fabric (e.g., an interconnect 9) to other similar storage servers (e.g., a storage server 5) which have their own local storage subsystems (e.g., a storage subsystem 6). In this way, all of the storage subsystems can form a single storage pool, to which any client of any of the storage servers has access.

In some embodiments, the storage servers 2 and 5 are configured as cluster partners. In a cluster configuration, when one of the server fails (the failed server), its cluster partner can take over the storage subsystem 4 attached to the failed server via a direct loop cross-connection (e.g., dashed lines 7 or 8). After the failed server is rebooted and its service restored (the restored server), the storage subsystem 4 that was taken away is given back to the restored server. Thus, the cluster configuration ensures uninterrupted service to the clients 1, even if server 2 or server 5 fails.

Figure 2:
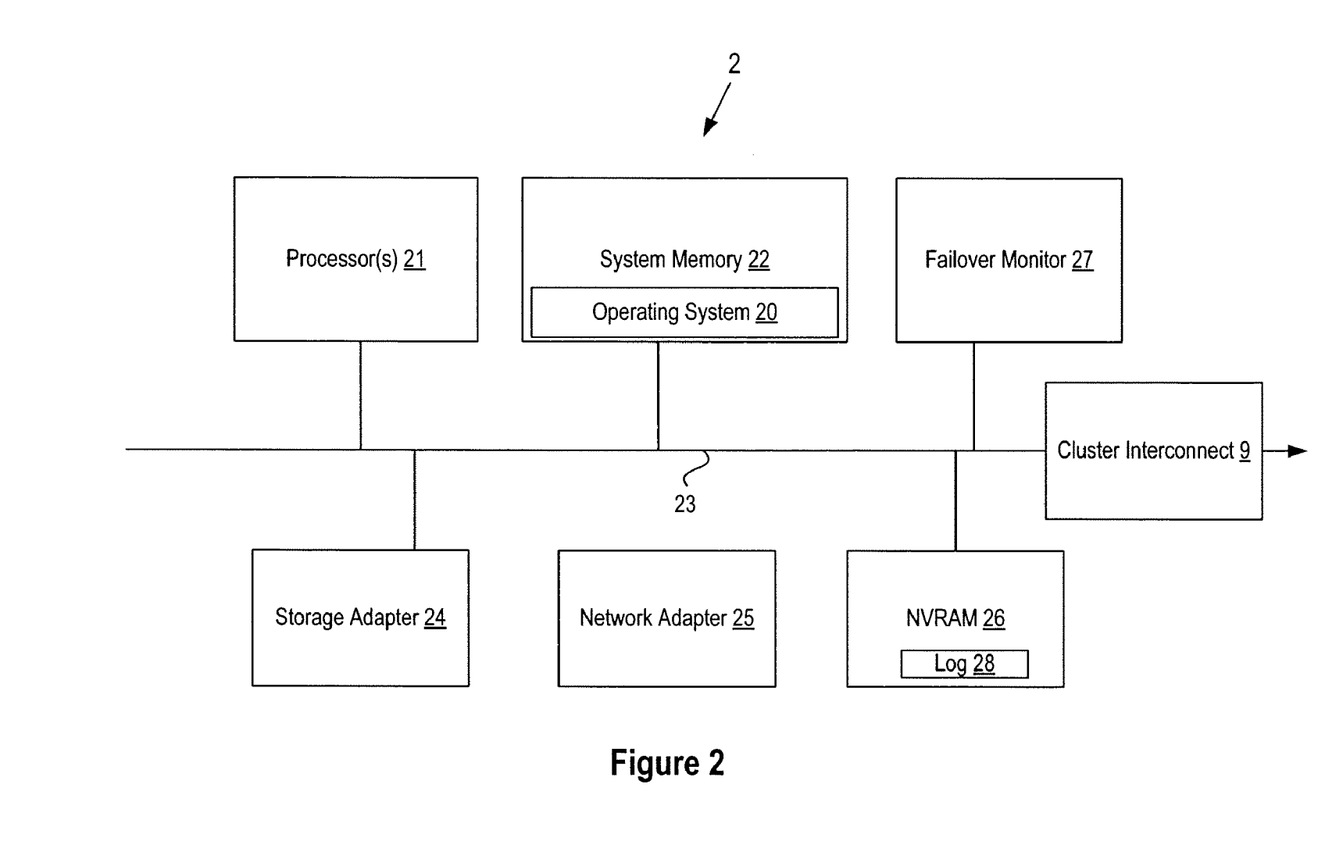
FIG. 2 illustrates an example of the hardware architecture of the storage server.

FIG. 2 is a block diagram showing an example of the architecture of the storage server 2 at a high level. Certain standard and well-known components, which are not germane to the present invention, are not shown. The storage server 2 includes one or more processors 21 and memory 22 coupled to a bus system 23. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 21 are the central processing units (CPUs) of the file server 2 and, thus, control its overall operation. In certain embodiments, the processors 21 accomplish this by executing software stored in memory 22. Such processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 22 includes the main memory (or equivalently, the system memory) of the file server 2. Memory 22 represents any form of random access memory (RAM), read-only memory (ROM), flash memory, or the like, or a combination of such devices. Memory 22 stores (among other things) a storage operating system 20, which can implement the technique introduced herein.

Also connected to the processors 21 through the bus system 23 are a storage adapter 24 and a network adapter 25. The storage adapter 24 allows the file server 2 to access the storage subsystem 4 of FIG. 1, and may be, for example, a Fibre Channel adapter or a SCSI adapter. The network adapter 25 provides the file server 2 with the ability to communicate with remote devices, such as the clients 1, over a network and may be, for example, an Ethernet adapter, a Fibre Channel adapter, or the like.

The storage server 2 also includes NVRAM 26 to provide fault-tolerant backup of data. The NVRAM 26 is typically a large-volume solid-state memory array having either a backup battery, or other built-in last-state-retention capabilities (e.g. a FLASH memory), that holds the last state of the memory in the event of any power loss to the array.

In a known implementation, when a client transaction request is received by the storage operating system 4, that request is stored in a log file 28 in the NVRAM 26 as a journal entry. The NVRAM 26 is loaded with requests until such time as a consistency point (CP) is reached. CPs occur at fixed time intervals, or when pre-determined key events arise. Each time a CP occurs, the updated data stored in the filer's buffer cache resulting from the requests received since the last CP are written from the filer's buffer cache to disks. Immediately thereafter, the log file 28 in the NVRAM 26 can be overwritten with new requests. In general, the NVRAM log 28 is replayed to re-perform any requests logged therein for its own filer (and an associated cluster partner filer, if any) between the last CP and an interruption in storage handling. In addition, the NVRAM log 28 is replayed during reboot.

Thus, in the event of an unexpected shutdown, power failure or other system problem, which interrupts the normal flow of information among the clients 1, storage operating system 20, and the storage subsystem 4, the NVRAM 26 can be used to recover information logged since the last CP prior to the interruption event.

In some embodiments, the storage server 2 includes a failover monitor 27. The failover monitor 27 monitors the condition of a cluster partner through the cluster interconnect 9. When the failover monitor 27 detects a failure of the cluster partner, the failover monitor 27 notifies its processor 21 to initiate a takeover action.

Figure 3:
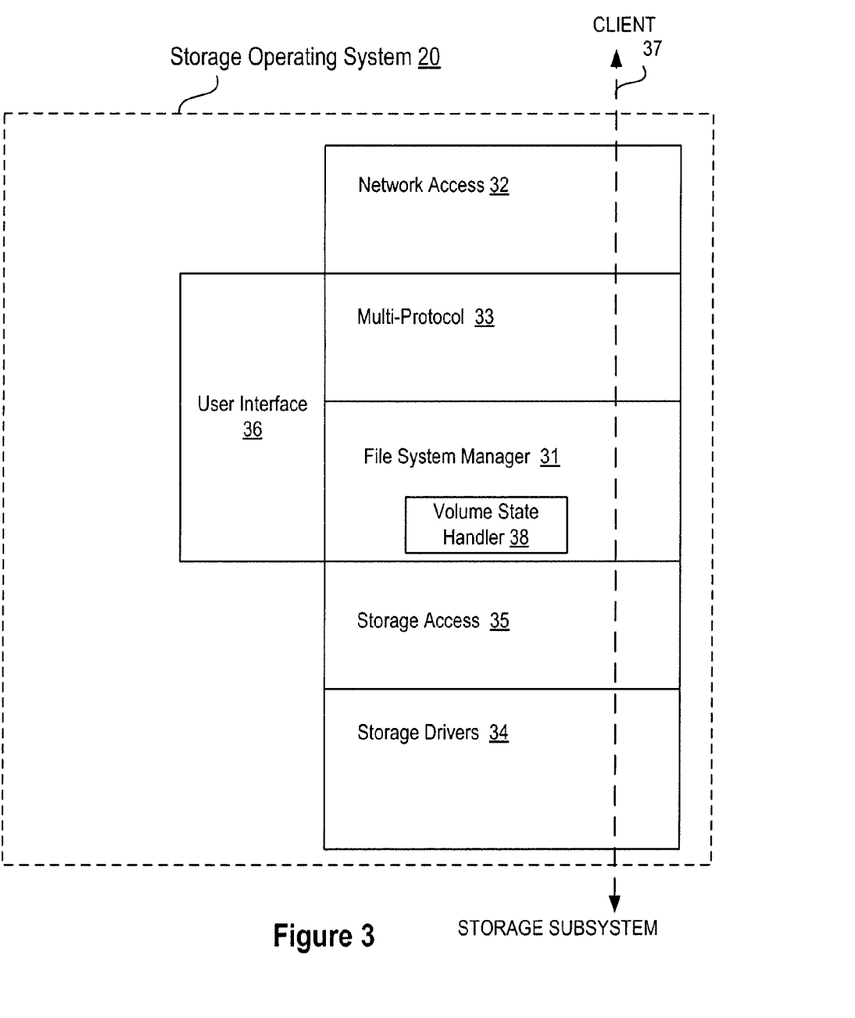
FIG. 3 illustrates the architecture of an operating system of the storage server.

FIG. 3 illustrates an example of the storage operating system 20 for controlling the operations of the storage server 2. The operating system 20 and its constituent elements are preferably implemented in the form of software. However, in some embodiments, some or all of the elements of the operating system may be implemented in the form of hardware (e.g., specially designed circuitry), or as a combination of hardware and software.

As shown, the operating system 20 includes several modules, or "layers". These layers include a file system manager 31. The file system manager 31 is software that manages the one or more file systems managed by the storage server 2. In particular, the file system manager 31 imposes a hierarchy (e.g., a directory/file structure) on the data stored in the storage subsystem 4 and manages client-initiated read and write operations at a high level (while delegating certain functions to lower layers of the operation system 20).

To allow the storage server 2 to communicate over the network 3 (e.g., with clients 1), the operating system 20 also includes a network access layer 32, and a protocol layer 33 operatively coupled between the file system manager 31 and the network access layer 33. The protocol layer 33 implements a number of higher-level network protocols, such as Network File System (NFS), Common Internet File System (CIFS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 32 includes one or more drivers which implement one or more lower-level protocols to communicate over the network, such as Ethernet or Fibre Channel.

To enable the storage server 2 to communicate with the storage subsystem 4, the operating system 20 includes a storage driver layer 34, and a storage access layer 35 operatively coupled between the file system manager 31 and the storage driver layer 34. The storage access layer 35 implements a higher-level disk storage protocol, such as RAID-4, RAID-5 or RAID-DP, while the storage driver layer 34 implements a lower-level storage device access protocol, such as Fibre Channel Protocol (FCP) or SCSI. The storage access layer 35 is alternatively called the "RAID layer" in this description.

Also shown in FIG. 3 is the path 37 of data flow, through the operating system 20, associated with a client-initiated read or write request.

The operating system 20 also includes a user interface 36 to generate a command line interface (CLI) and/or graphical user interface (GUI), to allow administrative control and configuration of the storage server 2, from a local or remote terminal.

The file system manager 31 also includes a volume state handler 38 to keep track of mount states, mounting and unmounting sub-states of each volume in the storage subsystem 4. The volume state handler 38 is responsible for updating an on-disk file system control structure and an in-core volume control structure for each of the volumes. These control structures including various states, sub-states, and file status, as described below with reference to FIGS. 4 and 5, are managed by the volume state handler 38.

Figure 4:
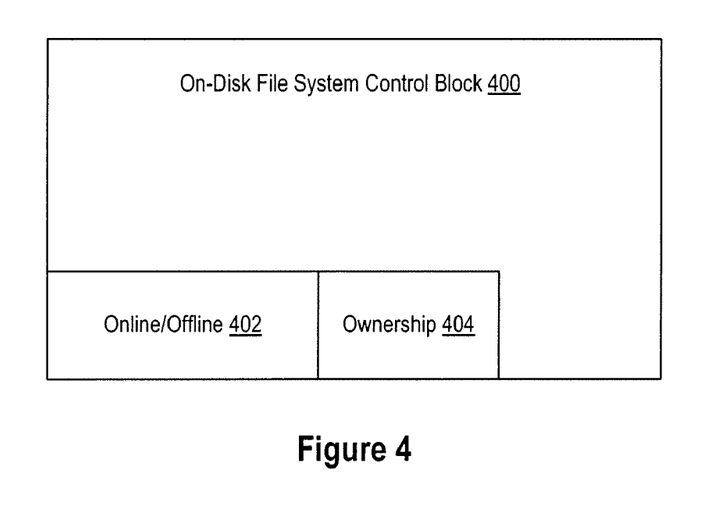
FIG. 4 illustrates a simplified block diagram of an on-disk file system control block.

Referring to FIG. 4, an on-disk file system control structure 400, organized as a block of metadata, is stored at a known location on each volume. The file system control structure 400 contains basic "state" information 402 related to whether the volume is currently "online" or "offline." A volume is considered to be online after being mounted. The block also contains ownership information 404 identifying the storage server that currently "owns" (e.g. manages) the volume. This owner can be the attached filer or a cluster partner in one embodiment. The file system control structure 400 can also store the state and other information in the form of variable values, field entries, flags, either within the structure, referenced by the structure, or otherwise associated with the structure.

Figure 5:
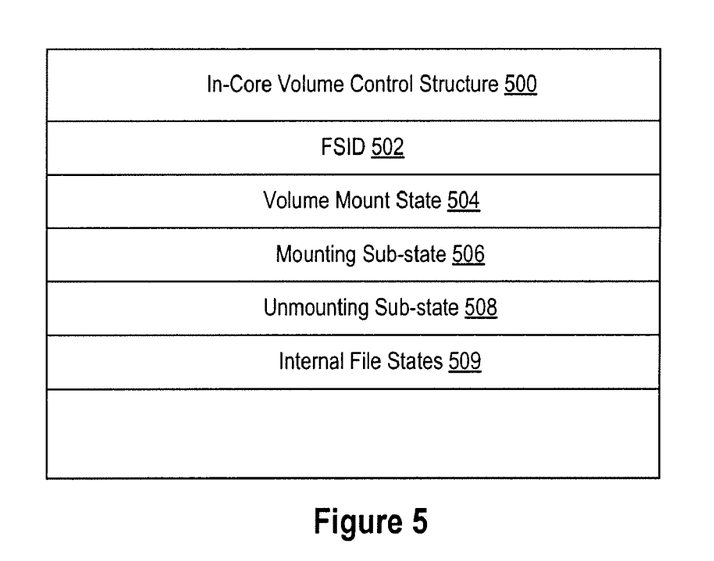
FIG. 5 illustrates a simplified block diagram of an in-core volume control structure.

Referring to FIG. 5, a separate in-core volume control structure 500 is stored in the system memory 22 (of FIG. 2) for each volume. The volume control structure 500 includes information needed to manage the volume's storage at a file system level. Briefly, the information within the volume control structure 500 includes a file system identification (FSID) 502 that uniquely identifies the volume based upon a hashing or other acceptable technique. The volume control structure 500 also stores a mount state 504 of the associated volume. Such mount state 504 can be, but are not limited to, any of the following:

VOLUME MOUNTED, which indicates that the volume is online and available for normal file system operations;

VOLUME MOUNTING, which is the transitional state when the volume is in the process of being mounted;

VOLUME PARTIALLY MOUNTED, which indicates that the volume is available for some, but not all, file system operations;

VOLUME NEEDS TO BE MOUNTED, which indicates that the volume is not yet mounted and is not in the process of being mounted, but will be mounted upon request;

VOLUME REPLAYING, which is the state indicating that the volume is devoted to replaying the records in the NVRAM log 28 (of FIG. 2) pertaining to the file system; and VOLUME REPLAYED, which is the state indicating that all records in the NVRAM log 28 pertaining to the file system have been replayed.

Other states may include VOLUME UNMOUNTED, VOLUME FROZEN, VOLUME DESTROYING, VOLUME CREATING, and NO VOLUME FSINFO, which are generally unrelated to the technique described herein and are not further described.

Referring further to FIG. 5, the volume control structure 500, according to an embodiment, also stores a mounting sub-state 506 or an unmounting sub-state 508, or both, for the associated volume. The mounting sub-state 506 and unmounting sub-state 508, as applicable, defines a key point of progress within the overall mounting or unmounting procedure, respectively. The volume control structure 500 can store the sub-states as variable values, field entries, flags that indicate the sub-state, either within the structure, referenced by the structure, or otherwise associated with the structure. Based upon this sub-state, certain file system requests are permitted or restricted, and other appropriate actions with respect to the file system and connected clients will occur.

For example, the mounting sub-states 506 may include, but are not limited to, the following sub-states to indicate the current state of the mounting process:

VOLUME MOUNTING_LOADING, which is the sub-state during which the volume's file system metadata are read into memory and initialized;

VOLUME MOUNTING_INITIALIZING, which is the sub-state during which the handling of internal configuration files needed for file system operation that are not part of file system metadata (e.g. quota files) is initialized; and VOLUME MOUNTING_FINAL, which is the sub-state used when file system initialization has been completed. The volume may, however, not be ready to respond to external file system requests, since the replay of records in the NVRAM log 28 pertaining to the file system may be necessary.

Additionally, in some embodiments, the volume control structure 500 includes a configuration file status field 509 to indicate the initialization status for each of the configuration files associated with a partially mounted volume. Initializing all configuration files for all online volumes can take up a large amount of system memory space. Thus, some configuration files not currently needed may remain un-initialized until such need arises later. As a partially mounted volume does not have all its configuration files initialized, the volume may not be available for all file system operations. For example, if quota files are not initialized, the volume is available only for read operations but not for write operations.

Using the volume states and sub-states described above, the storage server 2 can mount a volume on demand and reduce the time it takes to boot up the server. As there can potentially be far more flexible volumes than traditional volumes, in an embodiment, only the flexible volumes not needed during a group mounting event are mounted on demand. However, a person skilled in the art would appreciate that the on-demand mounting can be applied to any volumes, including both traditional and flexible volumes, that are not needed during the group mounting event, or to logical data containers other than volumes, such as aggregates, logical unit numbers (LUNs), etc. Thus, in one embodiment, when a group mounting event occurs, the storage server 2 mounts traditional volumes, aggregates, the root volume, and the flexible volumes that are needed for the NVRAM log replay. The other flexible volumes, which are not needed for the NVRAM log replay but the access to which is allowed, are mounted when they are first accessed.

The flexible volumes not mounted at a group mounting event have their names, file system identifications (FSIDs) and state information registered with the volume state handler 38 (of FIG. 3). The FSID and name registration is necessary to avoid duplication of the FSID and name when new volumes are created. State information is stored to indicate, among other things, whether a volume was online prior to reboot and should be automatically mounted on demand, or the volume was offline/restricted prior to reboot and should not be mounted upon request.

Figure 6A:
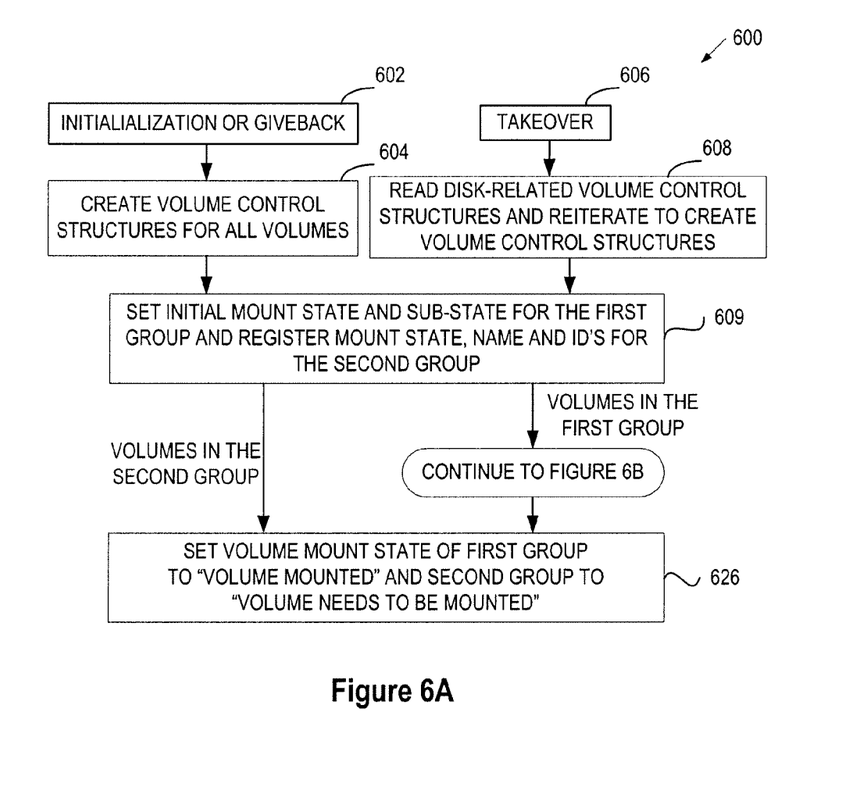
FIGS. 6A and 6B are flow diagrams of a process for mounting a group of volumes after initialization, takeover, or giveback of the storage server.
Figure 6B:
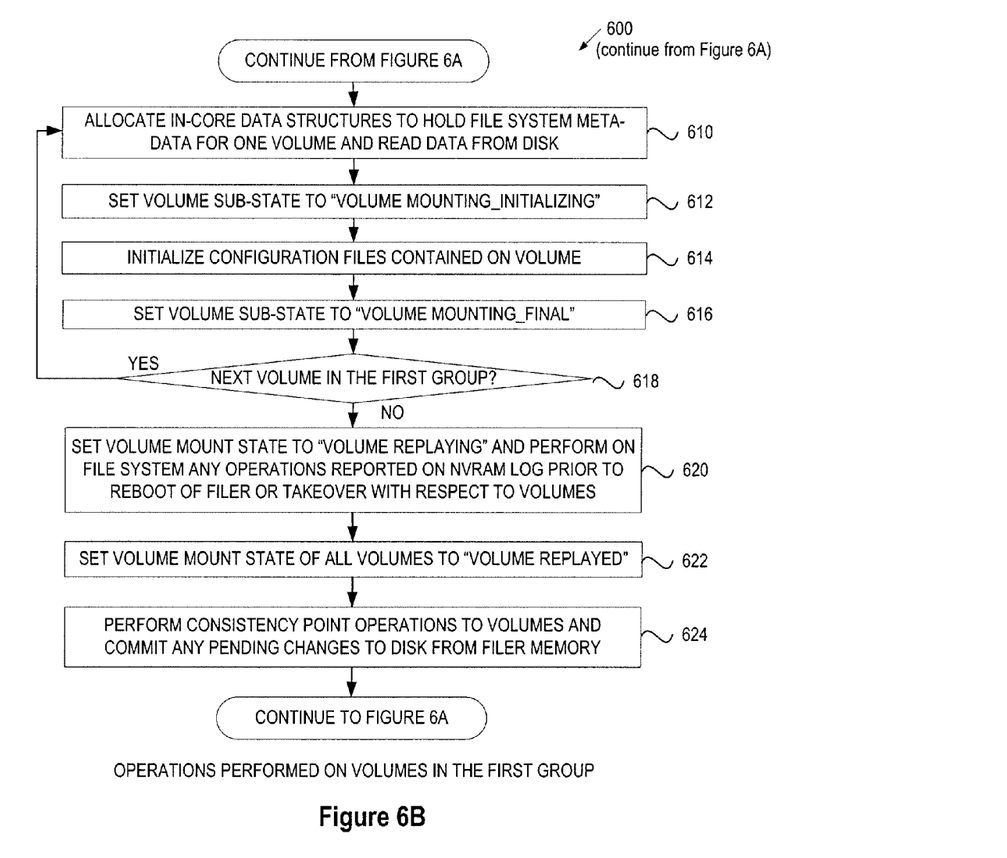
Figure 7:
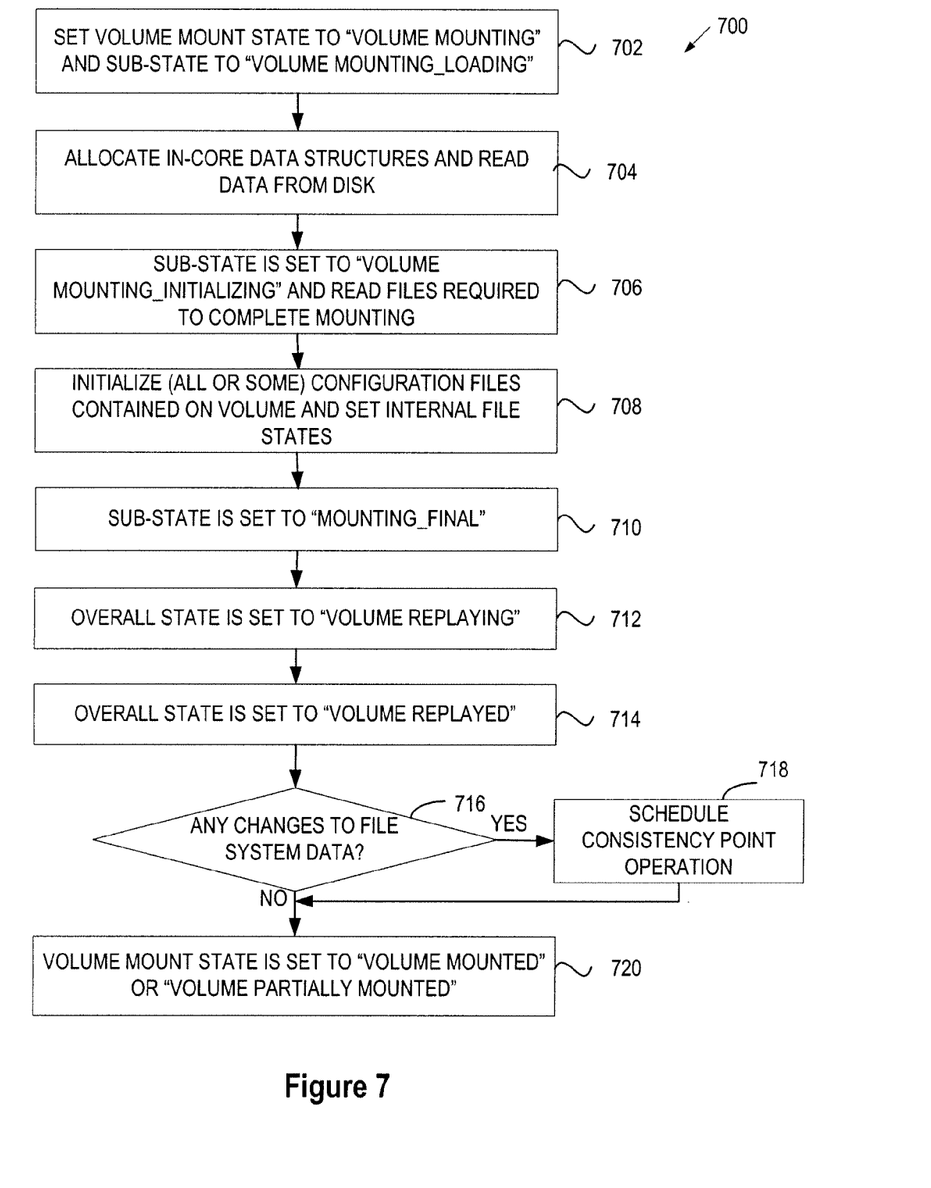
FIG. 7 is a flow diagram of a process for mounting a flexible volume on demand.

Reference is now made to FIGS. 6 and 7, which, respectively, detail procedures for mounting a group of volumes at a group mounting event and for mounting individual volumes on demand. The procedures may be performed by the storage operating system 20.

Referring to FIG. 6A, a procedure 600 for mounting a group of volumes after a filer initialization (after either a planned or unplanned shutdown), takeover, and giveback is shown. Prior to commencing the procedure 600, the file system manager 31 of the storage operating system 20 identifies two groups of volumes. The first group includes all volumes to be mounted at a group mounting event, e.g., traditional volumes, aggregates, the root volume, and the flexible volumes needed for the NVRAM log replay. The second group includes all of the flexible volumes to be mounted on demand, e.g., those flexible volumes that were online prior to reboot but are not in the first group. In the case of initialization or giveback (block 602), the file system manager 31 creates volume control structures (e.g., the volume control structure 500 of FIG. 5) for all volumes, including the first group and the second group (block 604). In the case of takeover (block 606), the disk-related volume control structures are read, and those read-in structures are reiterated within the file system to determine the set of volumes, including those in the first group and those in the second group, to be acted-upon (block 608).

In both cases, the volume state handler 38 sets the initial mount state to VOLUME MOUNTING for the first group and VOLUME NEEDS TO BE MOUNTED for the second group.

The volume state handler 38 further sets the mounting sub-state of the first group to VOLUME MOUNTING_LOADING, indicating to the file system that only file system requests devoted to the reading of metadata from disk may be processed, while other file system requests are rejected with an error indication. The volume state handler 38 also registers the mount states, names and file system identifiers of the second group of volumes in their corresponding volume control structures (block 609).

For each volume in the first group, the process 600 proceeds to FIG. 6B. For each volume in the second group, the process 600 proceeds to block 626, which is to be described below. Referring to FIG. 6B, for each volume in the first group, in-core data structures to hold file system metadata are, in turn, allocated. Internal file system requests are used to then read the metadata from disk into the in-core data structure (block 610) and the volume sub-state for the volume is set to VOLUME MOUNTING_INITIALIZING (block 612), thereby limiting access to files only required to complete mounting. Next, various configuration files on the volume are initialized, including quotas, character-set translations and security control (block 614). The mounting sub-state of the volume is then set to VOLUME MOUNTING_FINAL, indicating that file system initialization, giveback, or takeover has been completed (block 616). The volume may, however, not be ready to respond to external file system requests, since the replay of records pertaining to the file system in the NVRAM log may be necessary. At block 618, it is determined whether there are more volumes in the first group that have not been processed. If there is, the process 600 goes back to block 610. The above blocks 610-616 are performed for each volume in the first group until all attain the VOLUME MOUNTING_FINAL sub-state.

After all the volumes in the first group reach the VOLUME MOUNTING_FINAL sub-state, the process 600 branches to block 620, and the mount state for all the volumes in the first group is set to VOLUME REPLAYING. At this time the NVRAM log containing entries with respect to the volumes in the first group is replayed, and any file system operations recorded therein prior to initialization, takeover, or giveback are performed. The mount state for all volumes in the first group is then set to VOLUME REPLAYED (block 622), and the volumes are prepared, but are not yet ready, for the execution of new client requests. Next, the file system performs a consistency point operation, committing any pending changes in the volumes to disk from the filer's buffer cache (in system memory) (block 624). At this point, the process 600 returns to FIG. 6A. Finally, the mount state for all volumes in the first group is set to VOLUME MOUNTED and the second group is set to VOLUME NEEDS TO BE MOUNTED, indicating to the file system that the first group volumes are available for general use and the second group volumes are available upon request (block 626).

Referring to FIG. 7, a procedure 700 for mounting an individual flexible volume in the second group on demand is shown. Initially, the volume control structure 500 for the volume has its mount state set to VOLUME NEEDS TO BE MOUNTED, as described in block 609 of FIG. 6A. When access to a volume in the second group is requested, the volume control structure 500 for the volume has its mount state set to VOLUME MOUNTING and the associated sub-state set to VOLUME MOUNTING LOADING (block 702). In-core data structures within the filer's system memory 22 are then allocated, and native requests are used to read the metadata for the volume from the disks into the allocated data structures (block 704). The sub-state of the volume is then set to VOLUME MOUNTING_INITIALIZING. This sub-state indicates to the file system that files may be accessed, but the access is limited to the accessing/reading of volume files necessary for completing the mounting process (block 706).

Next, configuration files contained on the volume are initialized to facilitate various aspects of the file system's processing functions. The configuration files include, but are not limited to, quotas, character-set translation for international applicability and security control (block 708). In some embodiments, only the configuration files necessary for satisfying the request are initialized. For example, quota files contain information relating to the space allocated for write operations. Therefore, quota files are generally unnecessary for responding to a read request and do not need to be initialized for a read request. As the configuration files are generally scattered in various disks and initializing the files often incur disk latencies, limiting the configuration files initialized at volume mounting time further reduces the amount of time it takes to bring a filer online and does not incur additional memory pressure. Accordingly, at block 708, the internal file states 509 of FIG. 5 are set to indicate which configuration files have completed initialization and which ones have not.

Subsequently, the volume mounting sub-state is set to VOLUME MOUNTING_FINAL (block 710) and the mount volume state is set to VOLUME REPLAYING (block 712). In the case of mounting an individual volume, there will be no NVRAM entries associated with the volume which need to be replayed so the mount state is immediately set to VOLUME REPLAYED (block 714). Finally, the system determines whether there is updated data in the filer's buffer cache based upon the mounting process thus far (decision block 716). If updates have been made, then a consistency point operation, which commits filer buffer cache in memory to disk, is scheduled (block 718). The procedure 700 then completes with the mount state for the mounted volume set to VOLUME MOUNTED or VOLUME PARTIALLY MOUNTED, depending on whether all of the configuration files are initialized at block 708. At this point, the volume is available for general use (block 720). The VOLUME PARTIALLY MOUNTED state is transitioned to the VOLUME MOUNTED state when all of the configuration files are initialized (e.g., in response to a next access request).

To reduce the amount of system memory 22 occupied by metadata, control structures and internal files associated with mounted volumes, a volume that is the least likely to be reused in the near future can be unmounted. The determination of which volume to is the least likely to be reused can be based on a policy, e.g., the least recently used (LRU) policy, which removes a volume that has not been used for a predetermined period of time. When a volume is unmounted, its associated metadata, such as the inode metafiles, can be removed from system memory of the storage server 2 or recycled for use by other volumes.

Thus, a method and system for mounting volumes to a storage server on demand have been described. Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for mounting volumes to a storage server in a storage system, the method comprising:
   speeding up initialization of the storage server by staging volume mounting in two or more stages;
   mounting at least one of the volumes when a request for accessing the at least one volume is received; and
   maintaining volume control structures in the storage server to keep track of mount states for the volumes, wherein a first mount state indicates that access to a first volume that has not been mounted is permissible upon request, and wherein a second mount state indicates that a second volume is available for a subset of all file system operations.

2. The method of claim 1, further comprising:
   setting a mount state for a group of volumes to indicate that access to the group of volumes is permissible upon request and that the group of volumes has not been mounted to the storage server.

3. The method of claim 1, wherein setting states of the group of volumes further comprises:
   identifying flexible volumes not needed during a group mounting event as the group of volumes.

4. The method of claim 1, further comprising:
   partially mounting the at least one volume to only initialize configuration files needed by the request.

5. The method of claim 1, wherein initialization time of the storage server is independent of total number of volumes on the storage server.

6. The method of claim 1 further comprising:
   unmounting any volume that has not been accessed for a pre-determined time.

7. The method of claim 1 further comprising:
   unloading metadata from system memory, the metadata associated with a mounted volume that has not been accessed for a pre-determined time.

8. A storage system comprising:
   a storage subsystem to store a first group of volumes and a second group of volumes; and
   a storage server coupled to the storage subsystem to set a first mount state for the first group of volumes at a group mounting event, and to set a second mount state for the second group of volumes at the group mounting event to indicate that the second group of volumes has not been mounted, can be mounted on demand, and is available for a subset of all file system operations.

9. The storage system of claim 8 further comprising:
   system memory coupled to the storage server to maintain the first mount state for the first group of volumes to indicate completion of mounting, and the second mount state for the second group of volumes to indicate delay in mounting.

10. The storage system of claim 8, wherein the first group of volumes includes traditional volumes.

11. The storage system of claim 8, wherein the second group of volumes includes flexible volumes that are not needed for non-volatile random access memory (NVRAM) log replay during the group mounting event.

12. The storage system of claim 8, wherein the storage server partially mounts the second group of volumes to only initialize configuration files needed by the request.

13. The storage system of claim 8, wherein the group mounting event includes one of storage server initialization, takeover, or giveback.

14. A non-transitory machine-readable medium including a plurality of instructions which when executed by a machine perform a method of operating a system, the method comprising:
   mounting a first group of volumes in a first stage of a group mounting event and setting a first mount state for the first group of volumes to indicate that the first group of volumes are online and available for file system operations;
   setting, at the group mounting event, a second mount state for a second group of volumes to indicate that access to the second group of volumes is permissible upon request and that the second group of volumes has not been mounted to a storage server; and
   setting a third mount state for a volume in the second group of volumes to indicate that the volume is available for a subset of all file system operations.

15. The non-transitory machine readable medium as recited in claim 14, wherein the first group of volumes includes traditional volumes, aggregates, and flexible volumes needed for non-volatile random access memory (NVRAM) log replay during the group mounting event.

16. The non-transitory machine-readable medium as recited in claim 14, wherein the method further comprising:
   registering the mount states and identifiers of corresponding volumes in control structures of the storage server.

17. A method for mounting volumes to a storage server in a storage system, the method comprising:
   speeding up takeover or giveback of the storage server by staging volume mounting in two or more stages;
   mounting at least one of the volumes when a request for accessing the at least one volume is received; and
   maintaining volume control structures in the storage server to keep track of mount states for the volumes, wherein a first mount state indicates that access to a first volume that has not been mounted is permissible upon request, and wherein a second mount state indicates that a second volume is available for a subset of all file system operations.

18. The method of claim 17, further comprising:
   setting a mount state for a group of volumes to indicate that access to the group of volumes is permissible upon request and that the group of volumes has not been mounted to the storage server.

19. The method of claim 17, further comprising:
   partially mounting the at least one volume to only initialize configuration files needed by the request.

* * * * *